United States Patent

[11] 3,562,632

[72] Inventor James L. Kirkland
 Panama City, Fla.
[21] Appl. No. 819,285
[22] Filed Apr. 25, 1969
[45] Patented Feb. 9, 1971
[73] Assignee The United States of America as represented by the Secretary of the Navy

[54] NUCLEAR INDUCTION FLOW METER (UTILIZING PRINCIPLE OF NUCLEAR MAGNETIC RESONANCE)
 4 Claims, 3 Drawing Figs.
[52] U.S. Cl. .................................................. 324/0.5, 73/194
[51] Int. Cl. ............................................. G01n 27/00
[50] Field of Search ........................................ 324/0.5; 73/194

[56] References Cited
 UNITED STATES PATENTS
 3,191,119  6/1965  Singer ........................... 324/0.5
 3,419,793  12/1968  Genthe .......................... 324/0.5
 3,419,795  12/1968  Genthe .......................... 324/0.5

OTHER REFERENCES

V.V. Ekaterinin et al. Pulsed-Frequency NMR Flowmeter - Measurement Techniques - No3. - August 1965-pp. 279—281.

*Primary Examiner*—Michael J. Lynch
*Attorneys*—Louis A. Miller, Don D. Doty and William T. Skeer ABSTRACT: A magnetic field is established along a conduit and at right angles thereto. A fluid material flowing through the conduit has the atomic nuclei thereof excited for a brief interval by a magnetic field producing device external to the conduit. The excited nuclei precess about the axis of the magnetic field as the fluid moves through the conduit. At a point downstream from the point of excitation, the presences of the excited nuclei are detected by an electromagnetic transducer means also external to said conduit. The detected signal is amplified and delivered to appropriate circuitry to determine the flow rate of the fluid within said conduit.

JAMES L. KIRKLAND
INVENTOR.

William T. Skeer
BY                Agent

Don D. Doty
                  Attorney

3,562,632

NUCLEAR INDUCTION FLOW METER (UTILIZING PRINCIPLE OF NUCLEAR MAGNETIC RESONANCE)

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates to the field of electronic instruments. In particular, the invention relates to an electromechanical circuit configuration which utilizes a moving fluid material as a component part thereof. More particularly this invention relates to a device employing induced nuclear resonance in a discrete sample of a moving fluid material as a signal transfer device.

Although a variety of applications will suggest themselves to persons skilled in the electronics arts, the device will be described as it pertains to fluid material flowing within the confines of a conduit. Furthermore, the explanation will be facilitated by describing the device in relation to its application as a fluid flow meter.

Prior art fluid flow meters have design limitations that make them unsuitable at extreme temperatures, such as those employed in cyrogenic apparatus and encountered in space flight applications. Difficulties are also encountered in telemetering applications where additional circuitry must be employed to convert the sensed parameter of fluid motion into electrical signals suitable for transmittal to remote points.

Prior art devices also are not well suited to measurement of high flow rates. Such devices either offer impediments to the fluid flow, or divert small portions of the fluid to the measurement device. The latter types suffer in extended use, as the diverting arrangement no longer diverts the designed fraction of the total flow rate. The accurate measurement of high volume fluid flow rates is particularly critical in the fields of liquid fuel rockets and hydrojet propulsion systems.

The heart of any device for the measurement of fluid flow rates is the portion of the device which pertains to the detection of the fluid flow per se. In the instant invention this device is an electromechanical oscillator in which the fluid movement serves as the frequency determining element.

Prior art attempts to utilize fluid movement as the frequency determining element have not been completely successful. These prior art devices, for the most part, introduce some foreign substance or other discontinuity into the body of moving fluid. The obvious shortcomings of such devices are the contamination of the fluid and interruption of the uniformity of the fluid flow.

SUMMARY OF THE INVENTION

In the present invention, these problems may be overcome by employing nuclear resonance. As mentioned previously, this basic oscillator suggests a wide variety of applications in the instrumentation arts. The oscillator may be utilized to control valves or other functions, as will be appreciated by one versed in the pertinent arts.

The device of the invention induces a nuclear excitation in a discrete volume of the fluid by an electromagnetic field. The nuclei having excited energy levels are caused to precess by being carried by the flowing fluid through an established magnetic field. Their passage past a fixed transducer is inductively detected because of this precession. The detected passage signal is used to trigger the excitation of another volume to commence the next cycle of operation. The frequency of this cyclic action is the same as the flow rate and may be easily monitored for flow information.

In view of the foregoing discussion, it should be understood that an object of the present invention is the provision of an improved electromechanical oscillator circuit.

A further object of the present invention is the provision of an improved fluid flow meter.

A further object of this invention is the provision of a fluid flow meter using induced nuclear resonance.

A further object of this invention is the provision of an oscillator circuit having its frequency regulated by fluid movement.

A further object of this invention is the provision of an electromechanical oscillator using induced nuclear resonance.

A further object of the invention is the provision of a flow meter which is unaffected by temperature so as to be useful for extremely low temperature.

A further object of the invention is to provide a fluid flow meter useful in applications involving extremely high fluid flow rates.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENTS

Figure 1:
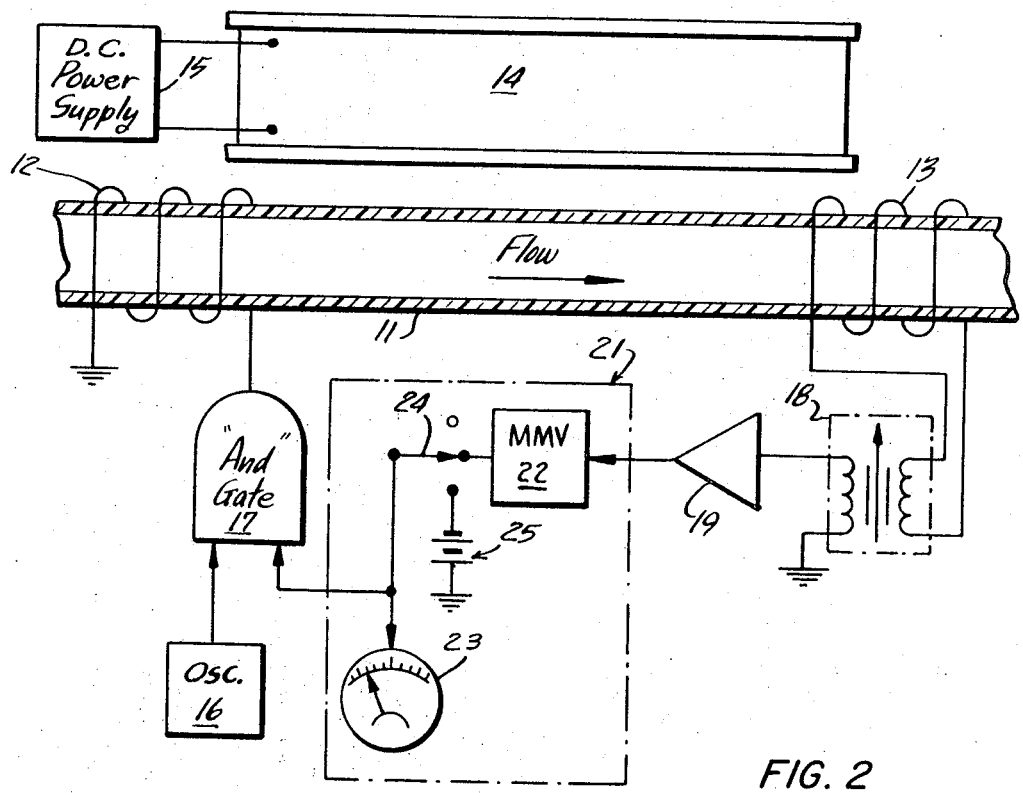
FIG. 1 is a schematic illustration of the basic circuit of the device.

Referring to FIG. 1, a section of a fluid conduit 11 is shown having inductive transducer windings 12 and 13 spaced at predetermined intervals therealong. A fluid, the velocity of which is to be measured, flows from left to right, as indicated by the arrow, within conduit 11. Conduit 11 is nonmetallic and has a magnetic permeability as close as possible to the ambient surroundings.

Positioned adjacent to conduit 11, so as to be operatively associated therewith, is a source of magnetic flux, such as a direct current solenoid 14. A direct current power supply 15 si connected to solenoid 14 to supply an energizing current thereto. The energizing current for solenoid 14 is of such a predetermined magnitude as to cause a magnetic field to be produced or broadcast so as to extend in a uniform fashion along the conduit 11 between transducer windings 12 and 13. It will be understood that solenoid 14 may be shaped to conform to conduit 11, so as to provide the desired field, as will be understood by those skilled in the electronic construction arts.

An oscillator 16 is connected via "and" gate 17 to inductive transducer winding 12. The frequency of oscillator 16 is regulated by known state-of-the-art techniques to a predetermined radio frequency. The particular frequency of oscillator 16 is very high in comparison to the response time of "and" gate 17 and is predetermined in accordance with the material flowing within conduit 11.

The various nuclei of the constituent elements flowing in conduit 11 comprise nucleons having a finite number of spin orientations, as now understood by particle physicists. Each orientation corresponds to a state of excitation and differs from the others by a finite amount of energy. The absorption or release of this energy by the nucleus accompanies the change from one energy state to another. Some spin configurations result in the nucleus having a magnetic charge associated therewith. The exact amount of energy required to obtain such two spin configuration differs for the particular nucleus and energy level in question. These different energies are reflected in the device of the invention as differences in the frequencies of electromagnetic energy absorbed to produce the desired transition.

To optimize the excitation of the largest number of nuclei, the frequency of oscillator 16 should correspond to the particular frequency associated with the nuclear transition sought. This alteration of the normal spin of the nuclei is known as induced nuclear magnetic resonance and abbreviated, herein, as INMR.

A charged particle subject to a central force directed toward a point will precess about an axis aligned with a uniform magnetic field in accordance with the following expression:

$$\omega = -\left[\frac{q}{2mc}\right]H$$

Where:
ω is the angular velocity;
q is the charge of the particle in esu;
m is the mass of the particle;
c is the velocity of light; and
H is the strength of the magnetic field in emu.

It will be noted that except for the value of strength of the magnetic field, H, all of the other parameters are constants for a given particle. Thus, for nuclear particles, where the values for constituent nuclei are fixed by nature, the expression becomes:
ω = k H.
Where:
ω is angular velocity;
k is a constant; and
H is the magnetic field strength in emu. This precession is known as Larmor precession and the frequency of precession as Larmor frequency.

Transducer winding 12 causes the fluid material enclosed thereby to experience a nuclear excitation due to the INMR produced by the output of oscillator 16 flowing through transducer winding 12. This localized volume of fluid is carried along conduit 11 by the flow of the fluid contained therein. When the volume of fluid with the INMR reaches inductive transducer winding 13, a voltage is induced therein by the nuclei precessing about the magnetic field of solenoid 14.

The induced electric voltage is fed from winding 13 to a coupling device 18, such as the tuned transformer shown. The coupling device 18 transfers the signal to an amplifier 19 connected thereto. The power of the signal is increased by amplifier 19 and is effectively coupled thereby to a frequency indicating circuit 21.

Frequency indicating circuit 21 is seen to comprise a monostable multivibrator 22 which is connected to amplifier 19 for receipt of the amplified, precession-induced signal therefrom. The recovery time of monostable multivibrator 22 is such that a pulse of suitable length is developed therefrom to be applied to "and" gate 17, so as to again energize winding 12 from oscillator 16 to start another cycle of operation. It is noted that the frequency of oscillator 16 is so high as to appear to the input of "and" gate 17 as a DC potential. Thus, it is seen that oscillation is sustained by the flow of fluid within conduit 11.

It is also seen that the frequency of oscillation is the same as the fluid transit time between transducer windings 12 and 13. This frequency may be read from a conventional electrical frequency meter 23 incorporated in circuit 21. As shown, the meter 23 is connected to monostable multivibrator 22 for receipt of the output pulses therefrom.

In order to provide for the initial cycle of operation, a switch 24 is provided to connect the "and" gate 17 to a suitable fixed DC potential source, such as battery 25. As illustrated, switch 24 may also be provided with a position to interrupt the feedback of the output of monostable multivibrator 22 to stop the operation of the device.

Figure 2:
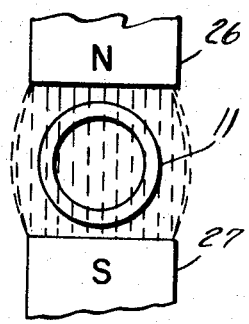
FIG. 2 is a cross-sectional view illustrating an alternate method of providing a magnetic field than that shown in FIG. 1.

As shown at FIG. 2, solenoid 14 and power supply 15 may be replaced by permanent magnets, if desired. Magnetic poles 26 and 27 are placed adjacent conduit 11. The magnetic field broadcast between magnetic poles 26 and 27 is illustrated by the broken lines extending therebetween. As shown, the field in the region of conduit 11 is linear and uniform. It is this uniformity of magnetic field that makes the use of artificial magnetic fields desirable in place of the earth's or other ambient magnetic field.

Figure 3:
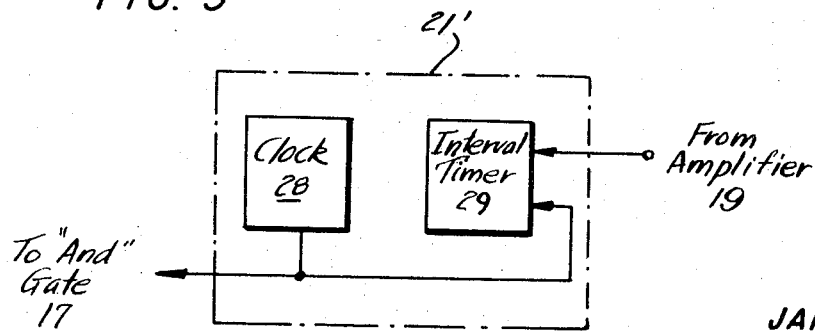
FIG. 3 is a schematic representation of an alternate circuit arrangement for use in a flow meter application.

FIG. 3 shows an alternate circuit arrangement for frequency indicating circuit 21 indicated by the numeral 21. In some instances the flow rate or transducer winding spacing does not lend itself to oscillation sustaining operation. It is for these applications that the arrangement of FIG. 3 is preferred. As may be seen, a clock circuit 28 produces a series of pulses which are fed to "and" gate 17 to gate pulses of the output of oscillator 16. The output of clock 28 is also fed by suitable circuit connections to an interval timer 29, so as to start an operational cycle of the interval timer. Interval timer 29 is also connected to amplifier 21 so that the amplified precession signal terminates the operational cycle of interval timer 29. From simple calculations which lend themselves to direct meter calibration, the flow rate may be determined knowing this transit time interval.

The various individual circuit arrangements are all standard state-of-the-art configurations. The details thereof are not shown, but are left to the dictates of those versed in the art. Similarly, the illustrations are instructional only and standard techniques are to be used in the actual construction. For example, some degree of decoupling between transducer windings 12 and 13 is generally required. This may be obtained by use of shielding or by coil placement in accordance with the preference of the constructor.

Likewise, it may be desired to make an instrument of general applicability in which case oscillator 16 may be replaced with a source of DC potential and the pulse width of monostable multivibrator 22 adjusted to produce a square wave output from "and" gate 17, or the output of monostable multivibrator 22 may be amplified and applied to winding 12 directly. These square wave pulses have sufficient harmonic content to provide excitation for a wide variety of nuclei.

From the foregoing description, taken together with the appended claims, it may be seen that applicant has disclosed an improved construction which meets the objects of invention and is a useful advance in the arts. Too, this description enables a person skilled in the instrumentation arts to make and use the device.

I claim:
1. A nuclear induction flow meter system comprising:
conduit means for passing a fluid therethrough;
a first inductive transducer means coaxially wound about said conduit means, so as to be contiguously disposed therewith for inducing a predetermined nuclear excitation within the nucleons of the nuclei of a fluid flowing therethrough in response to a first alternating current electrical signal of a frequency related to an energy state of said nucleons;
logic circuit means connected to said first transducer means for timely supplying said first electrical signal thereto in response to simultaneous receipt of second and third electrical signals;
electrical oscillator means of said frequency connected to said logic circuit means for continuously applying an alternating electrical signal of said frequency thereto, such as to comprise said second electrical signal;
monostable multivibrator means for providing said third electrical signal in the form of a gating pulse in response to a trigger pulse applied thereto;
a source of direct current electrical potential;
manually operable three position switch means connected between said logic circuit means, said monostable multivibrator means, and said source of direct current electrical potential for selectively connecting said logic circuit means to one of said monostable multivibrator means, said source of direct current potential, and to an unconnected switch terminal;
means contiguously disposed with a predetermined length of said conduit means and located downstream of said first transducer means for producing a unidirectional magnetic field which extends transversely across said conduit in such manner as to effect a predetermined precession of the nuclearly excited nuclei of the fluid flowing therethrough;
second inductive transducer means coaxially wound about said conduit means, so as to be contiguously disposed therewith and located downstream of said magnetic field producing means for detecting the passage of said precessing excited nuclei within 2. A flow meter according to claim 1 wherein said magnetic field producing means comprises:
   a solenoid coil means adjacent said conduit means and shaped to extend along said conduit means for said predetermined length; and
   a second source of direct current connected to said solenoid coil means for supplying electric current thereto so as to produce said magnetic field.

3. A flow meter according to claim 1 wherein said magnetic field producing means comprises permanent magnetic means so configured as to place opposite poles on either side of said conduit means along said predetermined length thereof.

4. A flow meter according to claim 1 wherein said means connected between said second transducer means and said monostable multivibrator means includes a two winding inductive transformer which is tuned for the Larmor precession frequency of said predetermined excited nuclei in the presence of said magnetic field and connected to said inductive transducer means.